Nov. 7, 1961 J. E. CLARKE 3,007,723
SEALING MEANS FOR HYDRAULIC RAMS OR THE LIKE AND METHOD
Filed Aug. 19, 1959
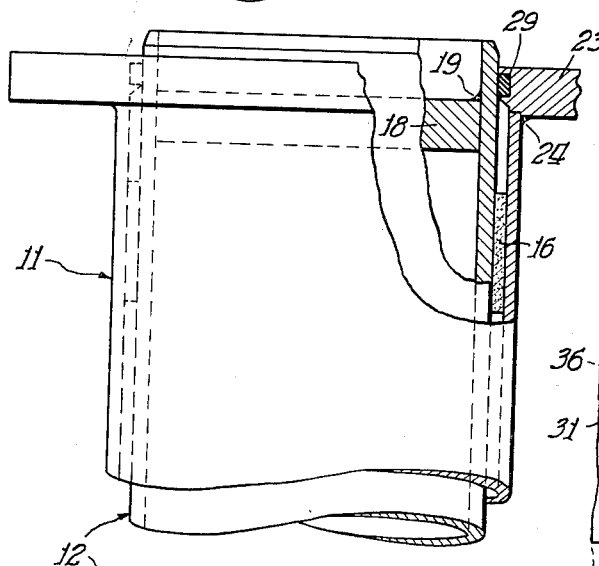
Fig. 1
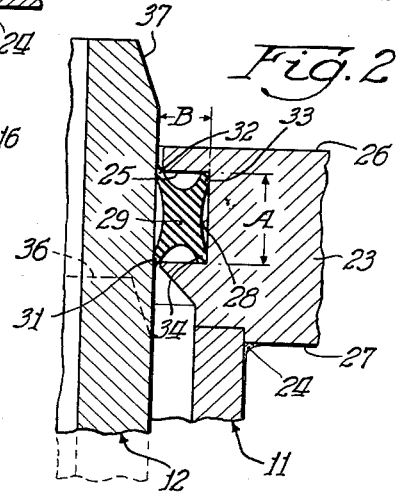
Fig. 2
Fig. 3
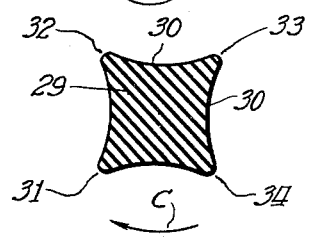
Fig. 4
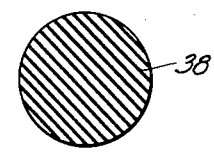
Fig. 5
Inventor:
Jesse E. Clarke
By: Jones, Darbo + Robertson
Attys.

United States Patent Office 3,007,723
Patented Nov. 7, 1961

3,007,723
SEALING MEANS FOR HYDRAULIC RAMS
OR THE LIKE AND METHOD
Jesse E. Clarke, Hinsdale, Ill., assignor to Autoquip Corporation, Chicago, Ill., a corporation of Illinois
Filed Aug. 19, 1959, Ser. No. 834,713
7 Claims. (Cl. 286—1)

This invention relates to sealing means for hydraulic rams or the like embodying a pair of telescoped relatively reciprocable members, such as a cylinder and a piston telescoped therein. In rams, for example, such as are used for automobile lifts in garages, filling stations, repair shops and other such locations, and more particularly where the piston is operated hydraulically, the oil or other hydraulic fluid is required to be sealed from escape from between the cylinder and piston at the upper end of the cylinder. Furthermore, such cylinders frequently are flush with or below a floor of a garage or other work shop and it is desirable to seal the space between the cylinder and piston against entry thereinto of water, dirt and other extraneous substance.

Heretofore, cap or gland rings have been provided which were required to be held to the cylinder by bolts or other extraneous fasteners, the gland ring carrying a sealing annulus of elastomer material on its inner periphery, access to which for replacement required removal of the gland ring after first removing bolts or other fasteners. Furthermore, the sealing annulus had only one life.

By means of the present invention, the sealing annulus is made accessible without removal of the gland ring. Furthermore, the sealing annulus is rotatable on the axis of its cross-section so as to present a new sealing edge to the piston, thereby contributing more than one life span to the sealing annulus. The invention is inclusive of the present novel method.

The invention furthermore provides a single ring that functions as both a wiper and a seal and that is re-usable by rotation.

By means of the present invention, replacement of the sealing annulus when required is simplified and enhancement of the life of the annulus accomplished, thus minimizing labor and expense in the maintenance of the ram.

The foregoing and other objects and advantages will be apparent from the following description, taken together with the accompanying drawing, showing an illustrative embodiment thereof, and in which drawing—

FIGURE 1 is an elevational view, partly in section, and broken away for economy of space, of a ram structure including a cylinder and piston, a lowered position of the piston being indicated in broken lines;

FIGURE 2 is an enlarged fragmentary vertical section corresponding to the upper right-hand corner of FIG. 1;

FIGURE 3 is a perspective view of a sealing annulus, shown on a reduced scale;

FIGURE 4 is a cross-section of the form of sealing annulus shown in FIG. 3, shown on an enlarged scale; and FIGURE 5 shows a cross-section of an alternative annulus.

Referring in detail to the illustrative construction shown in the drawing, the numeral 11 indicates a cylinder or casing for the piston 12 that, for use as an automobile ram lift, for example, is reciprocable vertically in the cylinder 11 under the influence of hydraulic fluid such as oil that is alternately forced under pressure into or evacuated from the space 13 between the lower or inner end of the cylinder and the lower or inner end of the piston. The piston and cylinder may carry closure plates respectively at their lower ends, for example, as here shown at 14 for the piston and 15 for the cylinder. Any suitable bearing means such as at 16 may be employed as a bushing in the cylinder 11 and in which the piston slides. The piston may carry a collar 17 at its lower end. At its upper end the piston carries another closure plate 18 that may be fillet welded to the inner face of the piston as at 19, just as the lower closure plate 14 is shown welded as at 20. The collar 17 is shown welded as at 21 to the outer face of the piston. Plate 15 may be welded as at 22 to the inner face of the cylinder.

Means for forcing hydraulic fluid into the space 13 to raise the piston is well known and need not be here shown.

In accordance with the present invention, mounted on the upper or outer end of the cylinder 11 is a solidly circular seal gland ring 23 welded to the cylinder as at 24 and constituting both a top for the cylinder and a seal annulus carrying means, that, in accordance with the present invention, is permanently secured to the cylinder and need not be attached thereto by nuts, bolts or other fasteners.

For seal carrying purposes, the ring 23 is provided with the internal groove 25 on its face adjacent the wall of the piston 12. The groove 25 is desirably nearer to the upper or outer surface 26 of the ring 23 than it is to the under or inner surface 27 of the ring.

The axial dimension as at A of the groove 25, that is, the vertical dimension in this instance, is desirably substantially larger than the radial dimension of the groove as indicated at B, which latter is the distance from the wall of the piston to the inner surface 28 of the groove.

Disposed in the groove 25 is the seal annulus, shown in separated perspective view at FIG. 3. It is to be understood that the seal annulus 29 is an annulus at least when it is installed in position as later indicated, although it may be rather limp, somewhat like a large rubber band, before installation. The annulus 29 preferably comprises an elastomer material such as artificial rubber that is resistant to the action of lubricants, water, heat and cold. A reasonably pliable and resilient synthetic rubber is suitable. The material of the annulus may have a Shore durometer reading of from 50 to 80. A sealing annulus of this character is available on the market sold by Minnesota Rubber Company and designated as their "Quad-Ring."

Further in accordance with the present invention, as seen in FIG. 4, a cross-section of the annulus 29 is substantially in the form of a square, preferably having retuse sides 30 and outwardly projecting somewhat acute corners. For convenience of description, these corners have been given the numbers 31, 32, 33 and 34, progressing successively in clockwise direction beginning with the lower left-hand corner of FIG. 4.

When the seal annulus of FIG. 3 for example, and having the cross-section of FIG. 4, is inserted into the ring groove 28, the ring 23 is advantageously exposed, on the inner face of the ring, by lowering the piston 12 to the dotted line position shown, for its lower end, at 35 (FIG. 1) and, for its upper end, at 36 (FIG. 2). The sealing annulus 29 is then inserted in the groove 25 and the piston elevated. The chamfer or bevel 37 around the top outer edge of the piston serves as a cam to press the seal annulus 29 inwardly into the groove 25 and to compress the cross-section of the annulus so that it changes from a square to an oblong, as best seen in FIG. 2, the longer dimension of which extends vertically or axially of the cylinder.

In the first instance, the corner 31 would provide a main sealing line contact with the piston. The corner 32 would provide a wiping edge preventing the ingress of water, dirt or the like to the sealing edge. The corner 33 would be relatively ineffectual. The corner 34 would provide another sealing edge at the lower inner corner of the groove.

It is to be understood that in normal reciprocation of the piston it would not be lowered to the position 35, to expose the groove 25 and annulus 29.

When, now, the sealing edge 31 becomes worn, the piston may be again lowered to the position 35—36, already referred to, and ready access is thus had to the sealing annulus 29 to remove the latter from the seal groove 25. The sealing annulus 29 may then be rotated ninety degrees on the axis of its cross-section, in the direction say of the arrow C (FIG. 4), and replaced in the groove 25. When thus rotated, the corner 34, which has had no wear, becomes a new sealing edge to take the place of the former worn sealing edge provided by the corner 31. The corner 31 becomes the wiping edge in place of the corner 32. The corner 33 provides a new unworn edge at the lower inner corner of the groove formerly occupied by the corner 34 to provide the seal at that point. The corners 34 and 33 have not previously been worn and therefore provide the equivalent of a new sealing annulus. The corner 31, which has been worn, provides the wiping edge which is not as critical as the sealing edge. Thus, the sealing annulus is given more than one life, and at least the equivalent of two lives. By further rotation in the direction of the arrow C, to bring the corner 33 to the main sealing position originally provided by the annulus corner 31, it could be given the equivalent of three lives.

There is thus here shown a single sealing annulus, acting both as a seal and as a wiper, and re-useable by rotation, such rotation being facilitated by the ready access afforded to the sealing annulus by the means provided for lowering the piston below the seal ring groove and to expose the latter without removing the ring from the cylinder.

FIG. 5 shows a sealing annulus of circular cross-section or in other words in the form of an O-ring. Some advantages of the invention, as for example ready access to the sealing ring groove, could be availed of even when using a sealing annulus of this O-ring form.

It will be understood that the dimension radially of a cross-section of the annulus 29 or 38 is initially greater than the dimension B, and that the dimension axially is initially somewhat less than the dimension A, so as to permit the axial elongation in the groove 25 with the extrusion into the clearance space between the gland ring 23 and the piston 12 providing a tight sliding fit, as here illustrated.

The invention having been described, such changes, including modifications or additions, may be made as fall within the scope of the appended claims without departing therefrom.

What is here claimed is:

1. The method of sealing hydraulic rams embodying a cylinder and a piston of less length than said cylinder and reciprocable therein and having a gland ring secured to the outer end of the cylinder with a sealing annulus groove in the inner face of the gland ring characterized by the steps of: placing a sealing annulus in said groove, then after wear on the annulus lowering the piston into and confined within the cylinder beyond its normal reciprocation stroke to expose said groove, rotating the annulus at least about ninety degrees and less than three hundred and sixty degrees to present a new sealing edge thereof to the piston, and raising the piston to normal position.

2. In a hydraulic ram apparatus comprising a cylinder having an open end and a piston in the cylinder and movable in a normal operating stroke through said open end, the improvement including: said cylinder being substantially longer than said piston to permit said piston to be fully retracted and confined within said cylinder beyond said normal operating stroke to expose a portion of the interior of the cylinder at the open end thereof; an annular groove in said portion of the cylinder; and a seal ring positioned in said groove and in contact with said piston during the normal operating stroke, whereby said piston will hold said ring in said groove during the normal operating stroke and, with said piston fully retracted, the ring may be removed and replaced.

3. An apparatus as set forth in claim 2, wherein the cylinder has a seal gland ring welded thereto and defining the open end of the cylinder, said annular groove being in said ring.

4. An apparatus as set forth in claim 3, wherein said gland ring has an outer face and an inner face and said groove is nearer the outer face than the inner face.

5. An apparatus as set forth in claim 2, wherein said ring is of elastomeric material substantially symmetrical in cross-section, whereby with said piston so retracted the ring may be rotated on the axis of its cross-section to present a new sealing edge on its inner periphery to bear against the piston.

6. An apparatus as set forth in claim 5, wherein the ring has the cross-section somewhat of a square with retuse sides.

7. An apparatus as set forth in claim 5, wherein the annulus has a round cross-section.

References Cited in the file of this patent

UNITED STATES PATENTS

| | | |
|---|---|---|
| 783,030 | Earley et al. | Feb. 21, 1905 |
| 2,584,679 | Dobrosavljevic | Feb. 5, 1952 |
| 2,700,561 | Svenson | Jan. 25, 1955 |
| 2,835,541 | Rhoads | May 20, 1958 |

FOREIGN PATENTS

| | | |
|---|---|---|
| 762,232 | Great Britain | Nov. 28, 1956 |